(12) United States Patent
He et al.

(10) Patent No.: US 7,873,183 B2
(45) Date of Patent: Jan. 18, 2011

(54) EMBEDDING AND DETECTING WATERMARKS BASED ON EMBEDDED POSITIONS IN DOCUMENT LAYOUT

(75) Inventors: Yuan He, Beijing (CN); Lin Luo, Beijing (CN); Ming Su, Tianjin (CN); Ling Shao, Beijing (CN); Zhe Xiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/603,057

(22) Filed: Oct. 21, 2009

(65) Prior Publication Data

US 2010/0104129 A1    Apr. 29, 2010

Related U.S. Application Data

(63) Continuation of application No. 11/457,559, filed on Jul. 14, 2006, now abandoned.

(51) Int. Cl.
*G06K 9/00*    (2006.01)
(52) U.S. Cl. ............... 382/100; 713/176; 380/252; 380/287; 380/54; 380/55; 358/1.11; 358/464
(58) Field of Classification Search ............... None
See application file for complete search history.

(56) References Cited

U.S. PATENT DOCUMENTS

| | | | | |
|---|---|---|---|---|
| 4,351,982 A | * | 9/1982 | Miller et al. | 380/30 |
| 5,467,447 A | * | 11/1995 | Vogel | 715/235 |
| 5,949,885 A | * | 9/1999 | Leighton | 380/54 |
| 6,625,780 B1 | * | 9/2003 | Charbon et al. | 716/1 |
| 6,804,374 B1 | * | 10/2004 | Beattie et al. | 382/100 |

OTHER PUBLICATIONS

Berghel, "Watermarking cyberspace", Nov. 1997, Communications of the ACM archive, vol. 40, Issue 11, pp. 19-24.*

* cited by examiner

*Primary Examiner*—Sath V Perungavoor
*Assistant Examiner*—Jason Heidemann
(74) *Attorney, Agent, or Firm*—Ido Tuchman; William Stock (57) ABSTRACT

A watermark embedding method for embedding a secret message sequence in a document. The techniques include obtaining layout information of the document, extracting a digest of the document by using a Hash function, calculating embedded positions where the secret message sequence is embedded in the document, and dispersedly hiding the secret message sequence in each of the calculated embedded positions by altering the layout of the document. Also provided is a watermark embedding apparatus, a corresponding watermark detecting method and apparatus, and a method and system for detecting document integrity. The integrity of documents in various forms can be detected, and secret information to be hidden can be embedded therein and extracted therefrom. The techniques described are not limited to the document either in soft copy or in hard copy and have good robustness.

38 Claims, 6 Drawing Sheets

EMBEDDING AND DETECTING WATERMARKS BASED ON EMBEDDED POSITIONS IN DOCUMENT LAYOUT

CROSS-REFERENCE TO RELATED APPLICATIONS

This application claims priority under 35 U.S.C. §120 as a Continuation Application of U.S. patent application Ser. No. 11/457,559 filed Jul. 14, 2006, which claims priority under 35 U.S.C. §119 to China Patent Application No. 200510084619.6 filed Jul. 14, 2005, the entire text of which is specifically incorporated by reference herein.

BACKGROUND OF THE INVENTION

The present invention generally relates to information security fields, and particularly to information security fields utilizing digital watermarking techniques and information hiding techniques.

Paperless office environment and electronic transactions are extensively adopted in current business world. Many important documents, such as wills, forms, identification and contracts, etc., require strict authentication and integrity assurance. For those documents containing sensitive information, even a small revision, such as adding, deleting, or modifying a paragraph, phrase, or word, is not allowed since it may cause great change to the meaning of the content and lead to great damage in business activities.

Digital signature is a traditionally well-known technique to verify the integrity of electronic content. This technique firstly generates a digest of the content by a one-way hash function, and then encrypts the digest by using the author's private key and appends it to the content to be signed. The whole procedure is the so-called digital signature. People who have the corresponding public key can decrypt the digest and verify whether it's the same as the hash value of the received content.

However, in most real applications, paper is still in an indispensable position. Signed documents are often printed out or faxed. In such cases, since digital signature requires side information (encrypted digest) transmitted together with the electronic document itself, it has noting to do with the case where electronic documents are printed out. Furthermore, digital signature can only ensure the integrity of the document, but cannot hide any additional information that the author will not let others to directly see.

Furthermore, with the development of digital techniques and the Internet, digital watermarking techniques have become a hotspot of multimedia information security research fields and an important branch of information hiding technique research fields. The techniques verify ownership of the data by embedding watermark information into original data. Such embedded watermark may be a segment of characters, identification or serial numbers and the like, and is often invisible or unobservable. The watermark is tightly combined with the original data (for example, text, image, audio or video data) and hidden therein, and can be maintained after being subjected to operations which do not destroy use value or commercial value of source data.

Text watermarking usually refers to the watermarking for text documents. A typical text document consists of regular structures including words, inter-word spaces, lines, paragraphs, and sometimes equations and graphs. Unlike data hiding method in still images and videos, there is less space in the text document to hide information.

In general, watermarking can be used in two kinds of applications: copyright protection and integrity check. For the two kinds of applications, the corresponding attack models and the technical requirements differ a lot. When used for copyright protection, the purpose of attack is to make the watermark irretrievable. Since text watermarking is vulnerable to deliberate destroy, it may encounter big technical challenges when using it for content protection. But in the application of integrity check, the potential attack is not to remove the watermark, but to modify the meaning of the watermark or the content. So, in this case, some deliberate destruction, such as non-linear processing, is not very important, but the robustness against distortions caused by normal printing, copying, and scanning is still required to match real-life applications.

Existing watermarking techniques are mostly symmetric watermarking techniques. In general, the integrity protection by means of symmetric watermarking techniques is realized by firstly encrypting the signature by applying public key algorithms into the digest of the text, and then hiding the encrypted digest into the document by symmetric watermarking techniques. However, for some applications, in addition to the need of verifying the integrity, there exists the need of adding extra secret information, for example, information which the author might not want others to see. If such information is embedded by means of symmetric watermarking, then a person, which is authorized to detect a watermark, can easily forge another watermark without permission, since embedding and extracting of the symmetric watermark can be derived from each other.

BRIEF SUMMARY OF THE INVENTION

Thus, an exemplary aspect of the present invention is a watermark embedding method for embedding a secret message sequence in a document. The method includes an obtaining operation of obtaining layout information of the document. An extracting operation is performed to extract a digest of said document by using a Hash function. A calculating operation calculates embedded positions where the secret message sequence is embedded in the document. A hiding operation dispersedly hides the secret message sequence in each of the calculated embedded positions by altering the layout of the document.

Another exemplary aspect of the invention is a watermark detecting method for detecting from a document a secret message sequence embedded therein. The method includes obtaining layout information of the document. An extracting operation extracts a digest of the document using a Hash function. A calculating operation calculates embedded positions where the secret message sequence is embedded in the document. An extracting operation extracts each secret message of the secret message sequence based on layout changes in each of the calculated embedded positions, respectively.

A further exemplary aspect of the invention is a watermark embedding apparatus for embedding a secret message sequence in a document. The apparatus includes a layout information obtaining unit for obtaining layout information of the document. A digest extracting unit is configured to extract a digest of the document by using a Hash function. An embedded position calculating unit is configured to calculate embedded positions where the secret message sequence is embedded in the document. An information hiding unit is configured to dispersedly hide the secret message sequence in each of the calculated embedded positions by altering the layout of the document.

Yet another exemplary aspect of the invention is a watermark detecting apparatus for detecting from a document a secret message sequence embedded therein. The apparatus includes a layout information obtaining unit for obtaining layout information of the document. A digest extracting unit is configured to extract a digest of the document by using a Hash function. An embedded position calculating unit is configured to calculate embedded positions where the secret message sequence is embedded in the document. An information extracting unit is configured to extract each secret message of the secret message sequence based on layout changes in each of the calculated embedded positions, respectively.

DETAILED DESCRIPTION OF THE INVENTION

The present invention will be described with reference to embodiments of the invention. The embodiments below do not limit the present invention described in claims and all the combinations of components described in the embodiments are not necessary for means to solve the invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

For the sake of simplicity and clarity of the present invention, in the following embodiments, it is assumed that the watermark embedding process is performed for an English text document and the text document to be processed only includes words and does not include equations and graphs etc.

Furthermore, it is assumed that a secret message sequence to be embedded, i.e., to be hidden in the text document is m: $\{m_0, m_1, m_2, \ldots, m_M\}$, wherein M+1 denotes length of the message sequence, $m_{j-1}$ denotes the $j^{th}$ hidden information in the message sequence, both M and j are nonnegative integers, and $0<j \leq M+1$. The secret message sequence m is pre-assigned, $m_0, m_1, m_2, \ldots, m_M$ denote an information bit to be hidden in the first, second, ..., $(M+1)^{th}$ position, respectively, and they may be one bit or more than one bit long. For example, if information of two bits is desirable to be hidden in the $j^{th}$ position, then $m_{j-1}$ is two-bit long. However, for the purpose of simplicity, in this embodiment it is assumed that only one bit information is hidden in each position.

Figure 1:
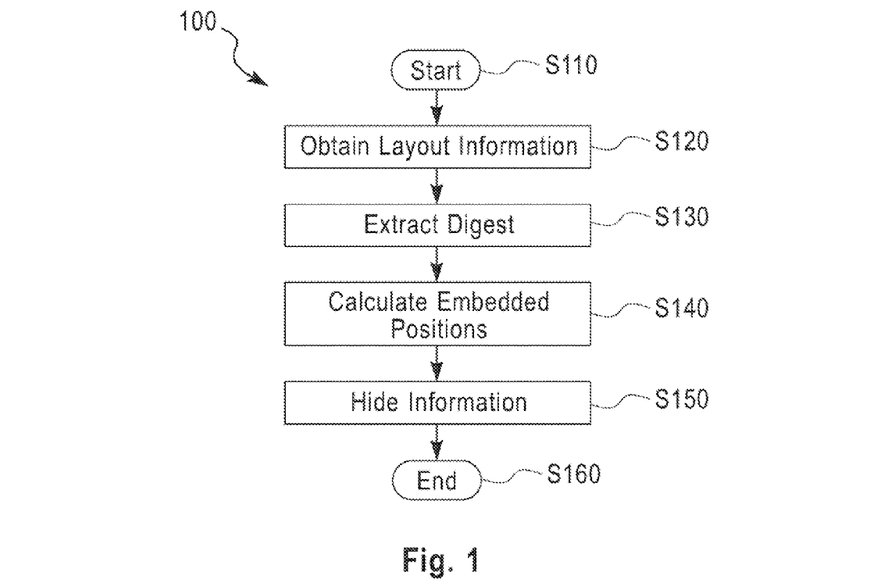
FIG. 1 shows a flowchart of a method 100 for embedding a watermark in an electronic text document according to an embodiment of the present invention.

FIG. 1 shows a flowchart of a method 100 for embedding a watermark in an electronic text document according to an embodiment of the present invention.

As shown in FIG. 1, the method 100 starts at step S110.

At step S120, makeup layout information (hereinafter, also called "layout information" for short) is obtained from the electronic text document, e.g., a word document, which comprises, for example, finding out an index of each line, locating words in each line and identifying inter-word spaces etc., and then a segmenting process is performed for the document on this basis, to divide the document into N segments, where N is an integer. One segment may contain combination of multiple words and may be multiple lines, e.g., two lines or more than two lines.

Next, at step S130, a digest of the text document is extracted, that is, a text hash TextHash of the text document, which is obtained from content of the text document by means of a one-way Hash function and might comprise more than one bit, is calculated.

Then, at step S140, embedded positions of the above message sequence m in the text document are calculated, that is, positions where the above message sequence m is hidden in the text document are calculated and determined.

Figure 2:
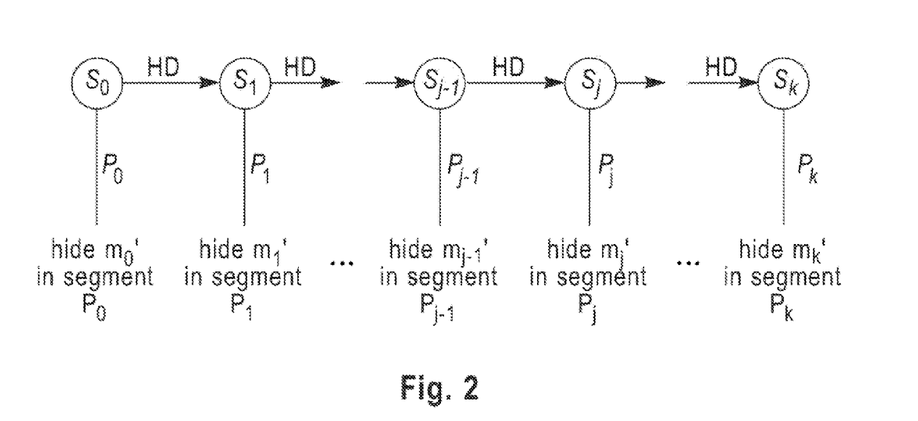
FIG. 2 shows a finite state machine (FSM) used in the method 100 as shown in FIG. 1.

In this embodiment, a public key driven finite state machine (FSM) is utilized to determine the order of the respective segments to be hidden with information. The finite state machine (FSM) is shown in FIG. 2, in which the message sequence m': $\{m_0', m_1', \ldots, m_K'\}$ is the secret information desirable to be embedded and the specific meaning thereof will be described hereinafter.

The RSA-based one-way hiding function HD and extraction function ET are defined as follows:

$$HD(x)=x^d (\bmod\ n),\ ET(x)=x^e (\bmod\ n),$$

where n=p*q, p and q are primes, d and e are a private key and a public key, respectively. p and q are kept private, while p*q and n are published. In general, if p and q are about 512 bits long, it is regarded as safe. The private key d satisfies $ed \equiv 1 (\bmod\ \phi(n))$, in which $\phi(n)=(p-1)(q-1)$ is an Euler function. Euclidean Algorithm can be used to calculate the private key d. Furthermore, in order to reduce the number of bits and complexity in the calculation process, Elliptic Curve Cryptosystem can also be used to replace RSA.

Assume that a state sequence is denoted by S: $\{S_0, S_1, \ldots, S_K\}$, and a position sequence for identifying which segment is chosen to be embedded or hidden with information bits is denoted by P: $\{P_0, P_1, \ldots, P_K\}$, in which $P_j \equiv S_j (\bmod\ N)$, N denotes the number of the divided segments in a document, K>M+1 and K>N. In order to ensure the security level, N is preferably no less than 64.

In addition, it should be noted that the length of the secret message sequence, i.e., M+1, is equal to the total number of the divided segments, i.e., N, since it has been assumed that only one information bit is hidden in one segment hereinbefore. Of course, it is possible for those skilled in the art to hide more than one information bit in each segment, or hide information bits of the length M+1 less than N in N segments (that is, in this case, no information is hidden in one or more existing segments), and in both cases N and M+1 must follow a certain relationship.

Assume that an initial state $S_0$ satisfies the following equation:

$$S_0=\text{hash}(m_0\|m_1\|\ldots\|m_N\|\text{TextHash}\|10\ldots 0),$$

where "$\|$" denotes concatenation, 10 . . . 0 is used to complement the message sequence to be hidden to 512 bits. In a preferred embodiment, MD5 hash algorithm is used. However, for those skilled in the art, it can be conceived that other secure hash algorithms can be applied to enhance the security level. It can be seen from the above calculation equation that $S_0$ is independent of the layout of the document, but dependent of the message sequence to be hidden and the content of the document.

After determining the initial state $S_0$, the following states can be calculated by using the private key d, that is, $S_j \equiv S_{j-1}^d$ (mod n), and then $P_j \equiv S_j (\bmod\ N)$ is calculated, in which $P_j$ indicates which segment is to be hidden with information.

Note here that, if a certain state $S_j$ is mapped to a position $P_j \equiv S_j (\bmod\ N)$ which is the same as a previous position $P_l \equiv S_l (\bmod\ N)$, where l is a nonnegative integer, and $0 \leq l \leq j-1$, that is, if $P_j = P_l$, then the case of duplicate embedding in the same position occurs, therefore, the currently calculated position $P_j$ is invalid. If the calculated position $P_j$ is not the same as any of the previous positions $P_0, \ldots, P_{j-1}$, then $P_j$ is valid, and $m_j'=m_j$. To avoid duplicate embedding in a certain position, when the calculated position $P_j$ is invalid, $m_j'$ is null, which means that no information is needed to be embedded in this position.

Then, the state sequence S and the position sequence P are iteratively calculated using the above method, until M+1 states $S_0, S_1, \ldots, S_K$ different from each other, as sell as M+1 positions $P_0, P_1, \ldots, P_K$ different from each other are calculated.

After obtaining the above position sequence P to be embedded with information, the method 100 proceeds to step S150.

At step S150, the above secret message sequence, i.e., $m_0'$, $m_1', \ldots, m_K'$ are embedded in the $P_0^{th}, P_1^{th}, \ldots, P_K^{th}$ position, respectively, that is, $m_i$ is embedded or hidden in the $i^{th}$ position $P_i$, i.e., the $P_i^{th}$ segment. Note here that the secret message sequence, rather than the hash value of the document which is only used to calculate the state values to ensure the integrity of the document, is to be embedded.

In this preferred embodiment, hiding information is implemented by altering the inter-word spaces.

For example, in the respective segments to be embedded with the secret message sequence m, a word grouping process is performed for words included in one line to divide them into a plurality of triplets having one word overlapped with each other, then one information bit is hidden in each corresponding segment by adjusting the sum of the length of the left inter-word spaces and that of the right inter-word spaces of all the triplets in this segment.

To reduce the effect of potential inaccurate word grouping in the document, in each line, the grouping is conducted from both sides of a line. Assume that a line with L words is represented by $w_1 w_2 w_3 w_4 w_5 w_6 \ldots w_{L-4} w_{L-3} w_{L-2} w_{L-1} w_L$, respectively, where L is a natural number. The triplet grouping process is as follows:

(1) getting the first triplet from left, i.e., $\underline{w_1 w_2 w_3}\ w_4\ w_5\ w_6 \ldots w_{L-4}\ w_{L-3}\ w_{L-2}\ w_{L-1}\ w_L$;

(2) getting the second triplet from right, i.e., $w_1\ w_2\ w_3\ w_4\ w_5\ w_6 \ldots w_{L-4}\ w_{L-3}\ \underline{w_{L-2} w_{L-1} w_L}$;

(3) getting the third triplet from left, i.e., $w_1\ w_2\ \underline{w_3 w_4 w_5}\ w_6 \ldots w_{L-4}\ w_{L-3}\ w_{L-2}\ w_{L-1}\ w_L$;

(4) getting the fourth triplet from right, i.e., $w_1\ w_2\ w_3\ w_4\ w_5\ w_6 \ldots \underline{w_{L-4} w_{L-3} w_{L-2}}\ w_{L-1}\ w_L$;

....

After performing the word triplet grouping process in the above manner, $$\left\lfloor \frac{L-1}{2} \right\rfloor$$

triplets can be obtained in all, where "$\lfloor\ \rfloor$" denotes the round off number operation.

Figure 3:
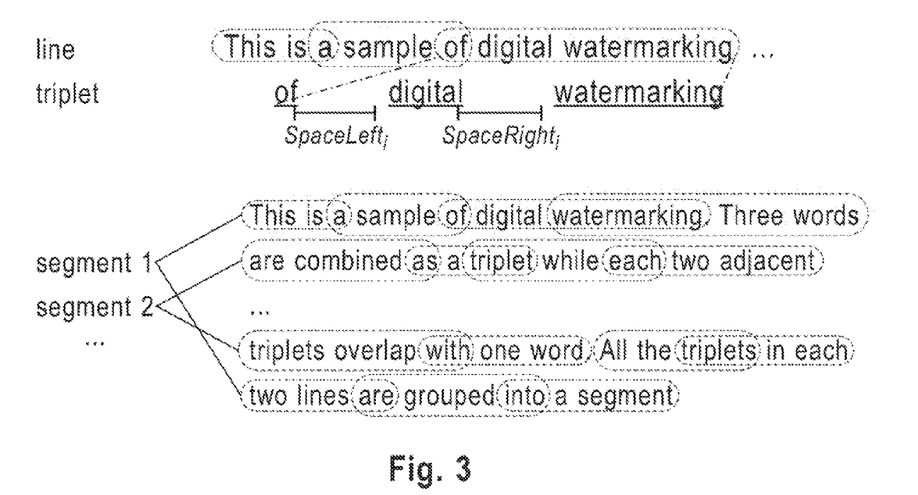
FIG. 3 shows an example of result after a word triple grouping process of a text document.

FIG. 3 shows an example of result after a word triple grouping process of an electronic text document. The case of the triple grouping process in two segments, especially in one line is shown in FIG. 3.

As shown in FIG. 3, it is assumed that in a certain segment consisting of t triplets (where t is a natural number), $SpaceLeft_i$ and $SpaceRight_i$ denote the left and right space within the ith triplet, respectively, where i is a nonnegative integer, and $0 \leq i \leq t-1$. A variable Threshold is defined to denote the maximum error tolerance capability against the inter-word space pixel errors caused by printing, copying and scanning. It may be set as a global fixed value, or a local value variant in different segments.

Assume the following equations:

$$L = \sum_{i=0}^{t-1} SpaceLeft_i,$$

$$R = \sum_{i=0}^{t-1} SpaceRight_i.$$

The hiding method used is as follows:

If one information bit of "1" is to be embedded in a certain segment, then all the middle words of all the triplets in the segment are shifted right by $$\left\lceil \frac{Threshold - (L-R)}{2t} \right\rceil$$

to satisfy L−R>Threshold;

If one information bit of "0" is to be embedded in a certain segment, then all the middle words of all the triplets in the segment are shifted left by $$\left\lceil \frac{Threshold - (R-L)}{2t} \right\rceil$$

to satisfy R−L>Threshold.

The left shifting or right shifting of words can be implemented by altering the format information of the electronic text document, e.g., altering the setting value of the inter-word spaces or adding blanks of the setting font size between words, etc. Note here that, if the information bit $m_j'$ to be embedded is null, then no information is needed to be embedded in the calculated $P_j^{th}$ segment, that is, it is not necessary to alter the inter-word spaces of all the triplets in this segment.

In the respective segments consisting of several triplets, to avoid that large-scale word shifting affects the visual quality or even the word grouping, the size of the left and right spaces in each triplet is estimated firstly, and thereby the middle word is shifted accordingly. If a certain triplet does not have enough space to shift, other triplets can be shifted more to complement its contribution.

Of course, for those skilled in the art, other information hiding methods can be used, for example, information can be hidden by altering the font style.

After step S150, the method ends at step S160.

Figure 4:
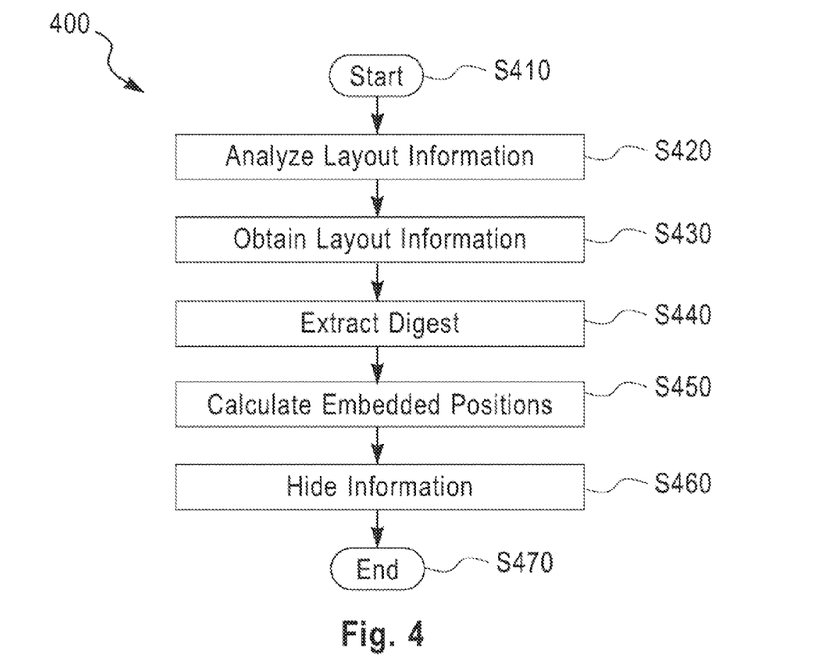
FIG. 4 shows a flowchart of a method for embedding a watermark in a text image document according to another embodiment of the present invention.

FIG. 4 shows a flowchart of a method 400 for embedding a watermark in a text image document according to another embodiment of the present invention.

The method as shown in FIG. 4 differs from the method as shown in FIG. 1 only in that a layout analysis process is executed before obtaining the layout information, since the method 400 is used for performing a watermark embedding process on a text image document, e.g., an image document in JPEG or TIFF format etc.

The method 400 starts at step S410.

Next, at step S420, the layout analysis process is executed on the text image document, including OCR recognition of the image document and other process, to obtain the layout information including text lines and words etc.

In a preferred embodiment, a component-based bottom-up layout analysis method may be used. For example, this method is disclosed in T. Furon, P. Duhamel, "An asymmetric watermarking method", IEEE Transactions on Signal Processing, Vol 51, Issue 4, pp. 981-995, April 2003. In this layout analysis method, some preprocessing works are firstly conducted, such as converting the image into binary format, filtering noise, and adjusting skew of text, etc, then all the connected areas are found out and clustered to be semantic blocks, and finally, the blocks are divided into text lines and words according to horizontal and vertical projections.

The processes of the following steps S430 to S470 are similar to those of the steps S120 to S160 as shown in FIG. 1, and thus the processes of these steps are omitted for the purpose of conciseness and clarity.

Figure 8:
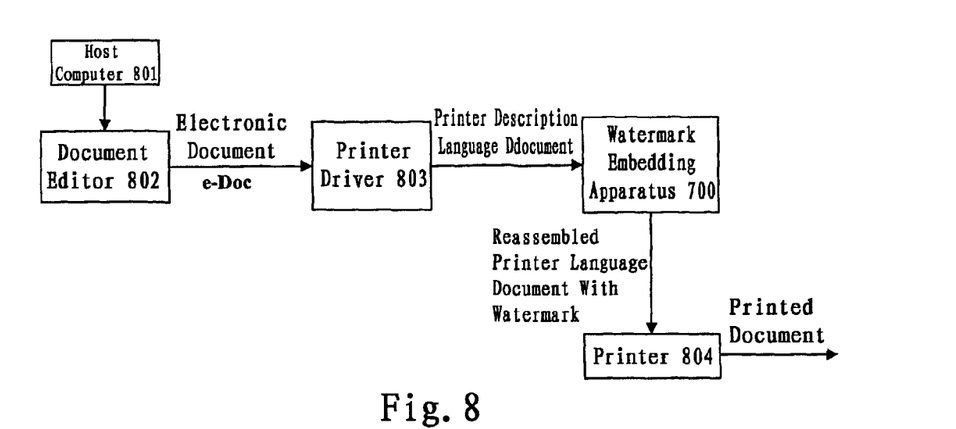
FIG. 8 shows an example of applications of the watermark embedding apparatus as shown in FIG. 7 in document integrity protection fields.

In another preferred embodiment, the watermark embedding method according to the present invention can be used to embed a watermark in an electronic document in printer description language format after issuing a document print command and before printing the document by a printer, the application of which in the document integrity protection is as shown in FIG. 8. In this case, in addition to the respective steps as shown in FIG. 1, the watermark embedding method also comprises, before step S120 of obtaining the layout information, a printer language analysis step of analyzing the printer description language document and then separating the printer command and the content of the electronic document, and after step S150 of hiding information, a printer language reassembling step of reassembling the above printer command and the content of the document with the watermark embedded therein to generate a reassembled printer language document with the watermark information.

Figure 5:
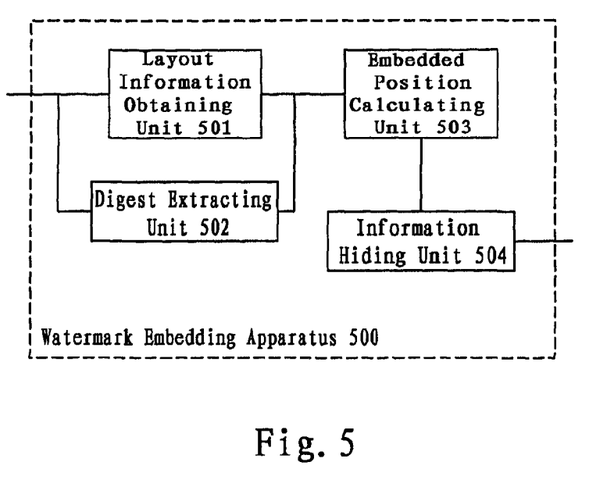
FIG. 5 shows a structural block diagram of a watermark embedding apparatus for embedding a watermark in a text document according to an embodiment of the present invention.

FIG. 5 shows a structural block diagram of a watermark embedding apparatus 500 for embedding a watermark in a text document according to an embodiment of the present invention.

As shown in FIG. 5, the watermark embedding apparatus includes a layout information obtaining unit 501, a digest extracting unit 502, an embedded position calculating unit 503 and an information hiding unit 504.

The layout information obtaining unit 501 obtains layout information from an electronic text document (for example, a word document) and divides the text document into several segments.

The digest extracting unit 502 obtains a digest of the text document, i.e., TextHash, by using a one-way Hash function based on content of the text document.

The embedded position calculating unit 503 calculates the embedded position $P_0, P_1, \ldots, P_K$ by using the method described above with reference to FIG. 1.

The information hiding unit 504 embeds a corresponding secret information $m_j$ in the corresponding position $P_j$ calculated by the embedded position calculating unit 503 by using the method described above with reference to FIG. 1, and generates a text document in which the watermark is embedded (that is, in which the secret information is hidden).

For the purpose of conciseness and clarity, the specific processes of the layout information obtaining unit 501, the digest extracting unit 502, the embedded position calculating unit 503 and the information hiding unit 504 are not described in detail.

Figure 6:
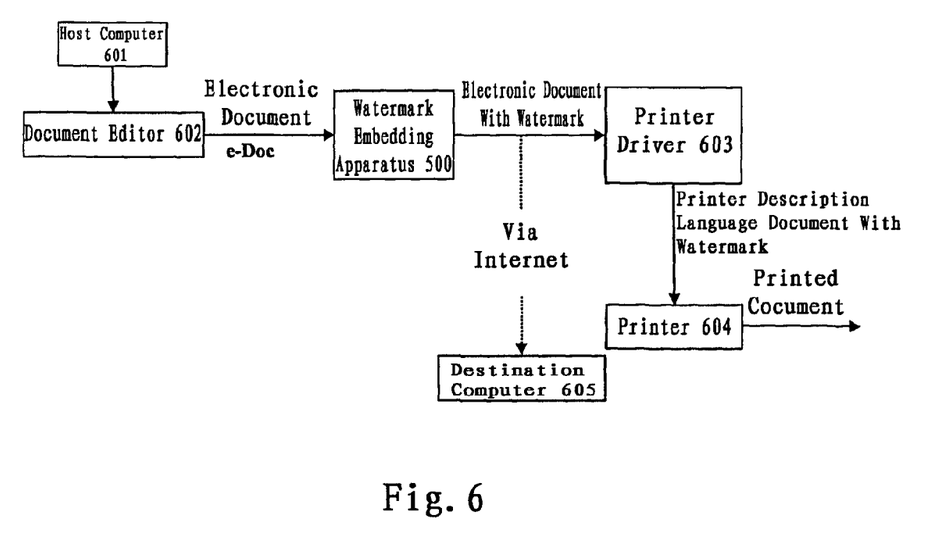
FIG. 6 shows an example of applications of the watermark embedding apparatus as shown in FIG. 5 in document integrity protection fields.

FIG. 6 shows an example of applications of the watermark embedding apparatus 500 as shown in FIG. 5 in document integrity protection fields.

As shown in FIG. 6, the watermark embedding process is executed by the watermark embedding apparatus 500 for an electronic document e-Doc edited by a document editor 602, for example, Microsoft Word in a host computer 601, to obtain an electronic document embedded with the watermark. Then, the document embedded with the watermark is transmitted to a destination computer via a network, or is printed out by a printer 604 after it is processed by a printer driver 603 to generate a printer description language document with the watermark and is transmitted to the printer port.

In another preferred embodiment, the watermark embedding apparatus according to the present invention can be used to embed a watermark in a text image document. At this time, in addition to the respective units as shown in FIG. 5, the watermark embedding apparatus also comprises a layout analysis unit (not shown in the drawing) for performing the layout analysis on the text image document and then providing the layout information obtaining unit 501 with the analysis result.

Figure 7:
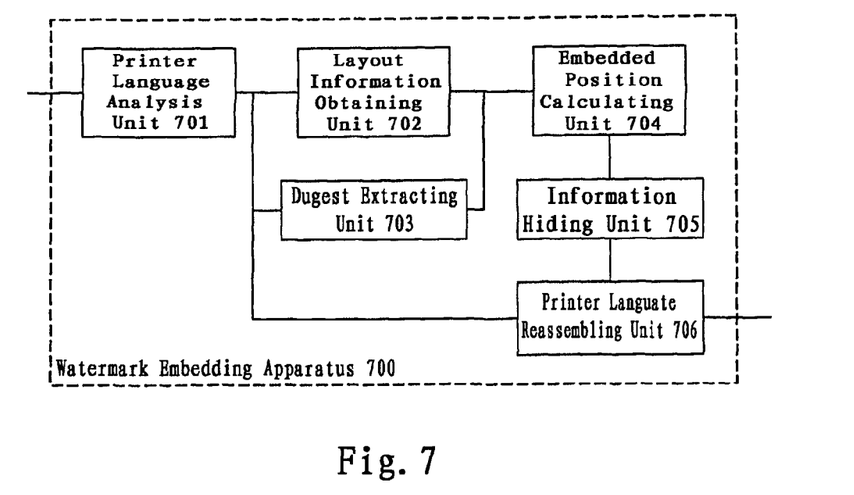
FIG. 7 shows a structural block diagram of a watermark embedding apparatus 700 for embedding a watermark in a text document according to another embodiment of the present invention.

FIG. 7 shows a structural block diagram of a watermark embedding apparatus 700 for embedding a watermark in a text document according to another embodiment of the present invention; while FIG. 8 shows an example of applications of the watermark embedding apparatus 700 as shown in FIG. 7 in document integrity protection fields.

As shown in FIG. 8, an electronic document e-Doc edited by a document editor 802 is processed by a printer driver 803 to generate a printer description language document, which then is embedded with a watermark by the watermark embedding apparatus 700 to generate a reassembled printer language document embedded with the watermark, and then this reassembled printer language document embedded with the watermark is transmitted to a port of a printer 804 and printed out by the printer 804.

As shown in FIG. 7, the watermark embedding apparatus 700 comprises a printer language analysis unit 701, a layout information obtaining unit 702, a digest extracting unit 703, an embedded position calculating unit 704, an information hiding unit 705 and a printer language reassembling unit 706.

The printer language analysis unit 701 analyzes a printer description language document and separates the printer command and the content of the electronic document e-Doc for further processing.

The processes of the layout information obtaining unit 702, the digest extracting unit 703, the embedded position calculating unit 704 and the information hiding unit 705 are similar to those of the layout information obtaining unit 501, the digest extracting unit 502, the embedded position calculating unit 503 and the information hiding unit 504 of the watermark embedding apparatus 500, and thus the descriptions thereof are omitted for the purpose of conciseness and clarity.

The printer language reassembling unit 706 reassembles the printer command and the content of the document embedded with the watermark to generate a reassembled printer language document with the watermark.

It should be noted that the watermark embedding apparatus according to the present invention can be implemented in other variant forms for those skilled in the art. For example, in the case of a printer with a powerful CPU controller, the watermark embedding apparatus can be integrated into the printer.

Figure 9:
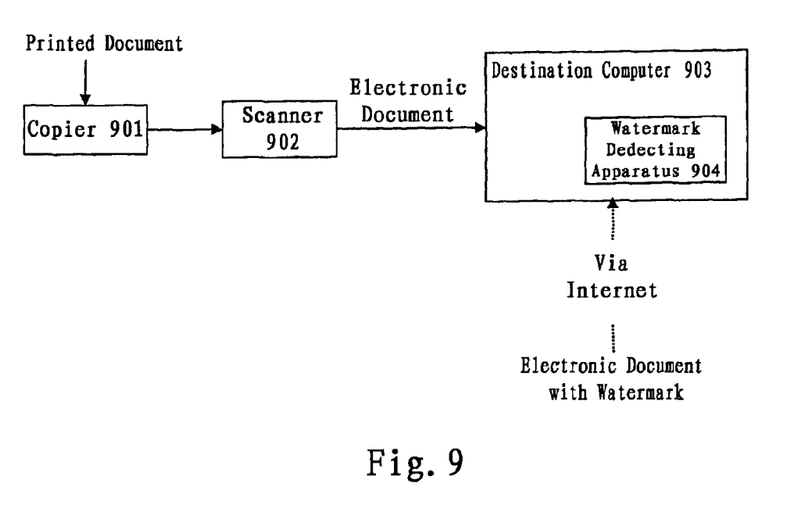
FIG. 9 shows an example of applications of a watermark detecting method and apparatus according to the present invention in document integrity protection fields.

FIG. 9 shows an example of applications of a watermark detecting method and apparatus according to the present invention in document integrity protection fields.

As shown in FIG. 9, a destination computer 903 might receive an electronic document with a watermark, which is processed by the watermark embedding method according to the present invention, from other computers via Internet. Furthermore, a printed document processed by the watermark embedding method according to the present invention might be copied by a copier 901 and scanned by a scanner 902 to generate an electronic document, which then is transmitted to the destination computer 903. After that, the destination computer 903 uses the watermark detecting method and apparatus according to the present invention, e.g., a watermark detecting apparatus 904 to decide whether or not the received document is complete and tampered.

Figure 10:
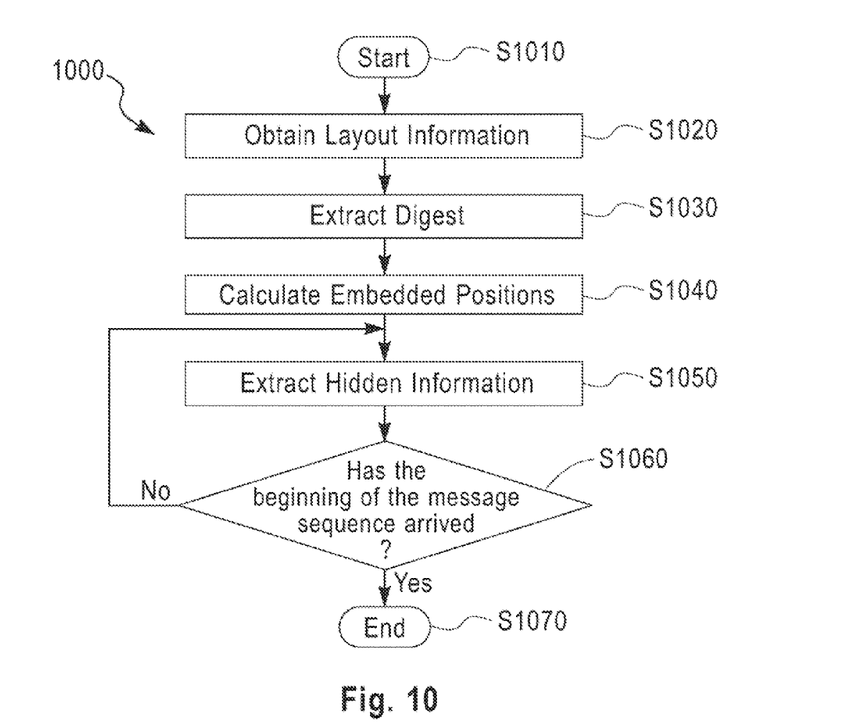
FIG. 10 shows a flowchart of a watermark detecting method 1000 for detecting and extracting from an electronic text document a watermark embedded therein (i.e., a secret message sequence m) and then verifying integrity of the text document according to an embodiment of the present invention.

FIG. 10 shows a flowchart of a watermark detecting method 1000 for detecting and extracting from an electronic text document a watermark embedded therein (i.e., a secret message sequence m) according to an embodiment of the present invention.

Figure 11:
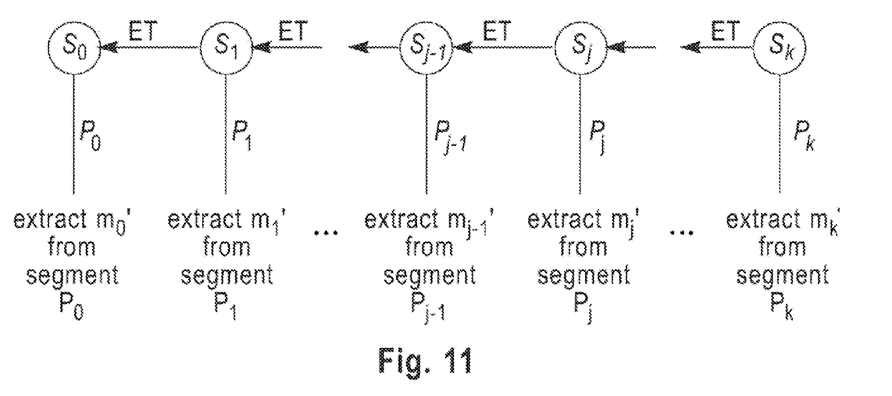
FIG. 11 shows a finite state machine (FSM) used in the method as shown in FIG. 10.

FIG. 11 shows a finite state machine (FSM) used in the method 1000 as shown in FIG. 10. As shown in FIG. 11, $S_{K-1}, \ldots, S_1, S_0$ and corresponding $P_{K-1}, \ldots, P_1, P_0$, i.e. the state sequence S and the position sequence P are iteratively calculated from $S_K$ by using the public key e according to $S_{K-1} = S_K^e \pmod{n}$, based on the process inverse to the embedded position calculating process described above with reference to FIGS. 1 and 2. It can be easily seen by comparing FIG. 2 with FIG. 11 that the finite state machine as shown in FIG. 11 is an inverse process of the finite state machine as shown in FIG. 1, in which the used key is the public key e corresponding to the private key e.

Note here that the rules for dividing the text document into several segments, $S_K$, n, the public key e, Threshold indicating the maximum error tolerance capability against the pixel errors caused by printing, copying and scanning, and the rules for hiding the message sequence m are all known for the watermark detecting party. For example, they may be transmitted from the watermark embedding party together with the electronic text document, or may be hidden in the document in paper format by means of conventional watermark embedding techniques (e.g., symmetric watermarking techniques). Of course, the above information may be notified to the watermark detecting party in other manners known by those skilled in the art.

For the purpose of conciseness and clarity, the same processes as those of the watermark embedding method described above with reference to FIGS. 1 to 3 are omitted, and hereinafter attention will be paid to those watermark detecting processes different from the watermark embedding processes.

As shown in FIG. 10, the watermark detecting method 1000 starts at step S1010.

At step S1020, layout information is obtained from an electronic text document, e.g., a word document, and then the document is divided into N segments based on the same segmenting rules as the watermark embedding party.

At step S1030, a digest is extracted based on the content of the text document, that is to say, a Hash value of the text, i.e., TextHash, is calculated.

At step S1040, the positions in which the watermark is embedded are calculated.

$P_K$ is calculated from $S_K$ based on $P_K \equiv S_K \pmod{N}$.

Next, at step S1050, the hidden secret information is extracted from the calculated embedded positions.

When extracting the hidden information, the same rules as the rules used when hiding information by the watermark embedding party are used. For example, still taken hiding information by altering inter-word spaces as an example, the description will now be given.

In the $P_K^{th}$ segment calculated by step S1040, let $$L = \sum_{i=0}^{t-1} SpaceLeft_i$$

and $$R = \sum_{i=0}^{t-1} SpaceRight_i,$$

and then compare L with R. If L−R>Threshold, then let $m_K' = 1$. Otherwise, if R−L>Threshold, then let $m_K' = 0$.

After that, at step S1060, it is decided whether the beginning of the secret message sequence has arrived or not. That is, the decision is made by calculating $S_{j-1} \equiv S_j^e \pmod{n}$ and $P_j \equiv S_j \pmod{N}$, and then by extracting $m_j'$ from the calculated position Pj. If the following equation is satisfied:

$$\text{hash}(m_j' \| m_{j+1}' \| \ldots \| m_K' \| \text{TextHash} \| 10 \ldots 0) = S_j \quad \text{Equation (1)},$$

which means that the beginning of the secret message sequence has arrived, that is, which means all the embedded secret information has been extracted from the text document, then the method 1000 ends at step S1070. In this case, the secret information embedded in the text document is $m_K'$.

If the two values in the Equation (1) are not the same, which means the beginning of the secret message sequence has not arrived. Next, the above steps S1040 to S1060 are repeated until the Equation (1) is satisfied.

It should be explained that in the above iterative calculation process, in order to be consistent with the information hiding process, if a posterior position $P_j$ is the same as a previous position $P_l$, that is, $P_j = P_l$, where $0 \leq l \leq j-1$, which means that $P_j$ is invalid, then let $m_l' = m_j'$ and make $m_j'$ null.

After the above iterative calculation process ends, that is, after it is determined that the above equation is satisfied, $m_0'$, $m_1', \ldots, m_K'$ can be obtained, in which the respective non-null values starting with $m_0'$ are the secret information $m_0, m_1, m_M$ actually hidden in the text document in proper order.

The watermark detecting method according to the present invention is also implemented in other variant forms. For example, it can be used for detecting the watermark in a text image document or a printed document in paper format. When used for detecting the watermark in the text image document, a step S1015 of OCR recognizing and analyzing layout information is needed to be added between step S1010 and step S1020. When used for detecting the watermark in the printed document, in addition to the above step S1015, a step S1011 of scanning the printed document is needed to be added before step S1015.

Figure 12:
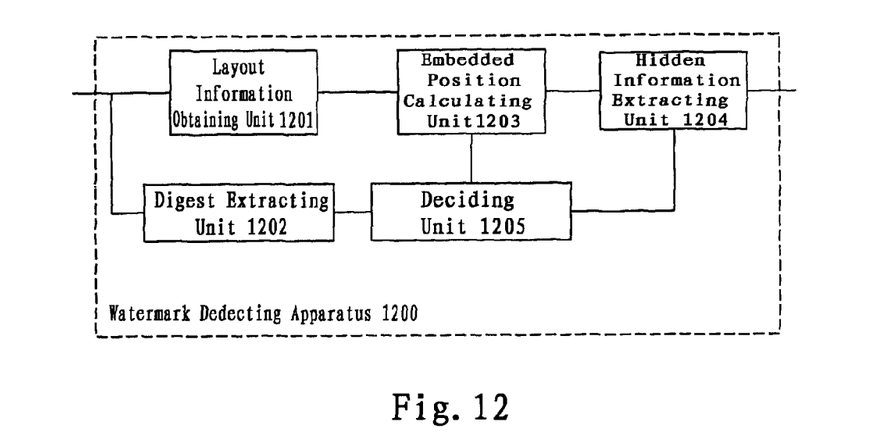
FIG. 12 shows a structural block diagram of a watermark detecting apparatus for detecting and extracting a watermark embedded in a text document according to an embodiment of the present invention.

FIG. 12 shows a structural block diagram of a watermark detecting apparatus 1200 for detecting and extracting a watermark embedded in a text document according to an embodiment of the present invention.

As shown in FIG. 12, the watermark detecting apparatus 1200 comprises a layout information obtaining unit 1201, a digest extracting unit 1202, an embedded position calculating unit 1203, a hidden information extracting unit 1204 and a deciding unit 1205.

The functions of the layout information obtaining unit 1201 and the digest extracting unit 1202 are similar to those of the layout information obtaining unit 501 and the digest extracting unit 502, and thus the descriptions thereof are omitted here.

The deciding unit 1205 decides, based on the current state, the extracted digest of the document and the respective extracted secret messages, whether all the embedded secret messages have been extracted or not, that is, decides whether the Equation (1) described above with reference to FIG. 10 is satisfied or not.

The embedded position calculating unit 1203 calculates the embedded positions $P_0, P_1, \ldots, P_K$ by using the method described above with reference to FIG. 10, and decides whether the beginning of the message sequence has arrived. The hidden information extracting unit 1204 extracts the hidden information from the corresponding calculated positions by using the method described above with reference to FIG. 10. The specific processes of the two units are omitted for the purpose of conciseness and clarity.

The secret information can be hidden safely in the text document including the electronic text document and the text image document by using the watermark embedding method and apparatus and the watermark detecting method and apparatus according to the present invention, and only the authorized receiving party, i.e., the receiving party having the public key can extract the hidden information from the text document. For the unauthorized receiving party, in the process of detecting the watermark, the probability of satisfying the Equation (1) is close to zero during the stipulated iterations, e.g. 16N iterations, and thus it is possible to detect malicious attacks.

Moreover, the authorized receiving party cannot forge or modify the hidden information even though he can extract and read the hidden information, since the above methods and apparatus according to the present invention are based on the public key pair. Therefore, by using the methods and apparatus according to the present invention, the integrity of the text document can be protected. Specifically, even though a person has been authorized to extract and read the hidden information, once he forges or modifies a certain hidden information bit $m_i$, the iteration terminating condition, i.e., the Equation (1) in the watermark detecting process cannot be satisfied, and thus the iterative calculation is infinite, and it will be reported that the integrity of the received document has been damaged.

In summary, the methods and apparatus according to the present invention can achieve better integrity protection of the text document in the whole document lifecycle including printing, copying and scanning, and can safely hide the information, which is not desirable to be seen by the public, in the document.

It should be noted that the embodiments described above are used only for illustrating the present invention and is not intended to make limitation to the present invention.

Furthermore, the respective processing operations described above can be implemented in the form of computer executable programs stored in various storage media. The storage media include and are not limited to various memories and memory units, semiconductor devices, magnetic disk units such as optical disks, magnetic disks and optical magnetic disks, as well as other media suitable for storing information. In addition, the present invention can be implemented by downloading programs via the network.

Although the embodiments of the present invention have been described in conjunction with the appended drawings, those skilled in the art can make any modification or change to the above embodiments without departing from the spirit and scope of present invention defined by the appended claims.

For example, although hereinbefore the preferred embodiments of the present invention have been described as to the watermark embedding process and the watermark detecting process for the text document including the electronic text document and the text image document, it is known for those skilled in the art that the present invention can be applied to video, audio and graphic documents.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A watermark embedding method for embedding a secret message sequence in a document, said method comprising:
   obtaining layout information of said document;
   extracting a digest of said document by using a Hash function;
   calculating by a computer processor embedded positions where said secret message sequence is embedded in said document, wherein said calculating the embedded positions is performed by means of a Hash digest of said document and a finite state machine driven by a public key encrypted algorithm, wherein said calculating the embedded positions further comprises calculating an initial state based on the extracted document digest and said secret message sequence, calculating a state sequence based on the initial state and a public key, and calculating the embedded position sequence based on the state sequence; and
   dispersedly hiding said secret message sequence in each of said calculated embedded positions by altering the layout of said document.

2. The watermark embedding method according to claim 1, wherein said obtaining the layout information further comprises dividing said document into a plurality of segments.

3. The watermark embedding method according to claim 2, wherein said hiding the secret message sequence further comprises dispersedly hiding each secret message of said secret message sequence by altering inter-word spaces in the corresponding segment indicated by each of the calculated embedded positions.

4. The watermark embedding method according to claim 2, wherein said hiding the secret message sequence further comprises dispersedly hiding each secret message of said secret message sequence by altering font styles in the corresponding segment indicated by each of the calculated embedded positions.

5. The watermark embedding method according to claim 1, wherein said document is a text document.

6. The watermark embedding method according to claim 1, wherein said document is an electronic document.

7. The watermark embedding method according to claim 6, wherein said document is a document in printer description language format, and wherein said watermark embedding method further comprises:
  before said step of obtaining the layout information, performing printer language analysis on the document in printer description language format, and separating a printer command and content of the electronic document itself for further processing;
  after said step of hiding the secret message sequence, reassembling the printer command and the content of the document embedded with the secret message sequence to generate a reassembled printer language document for printing.

8. The watermark embedding method according to claim 1, wherein said document is an image document, and said method further comprises a performing layout analysis on the image document before said obtaining the layout information.

9. The watermark embedding method according to claim 1, wherein said document is in paper format, and before said obtaining the layout information, said method further comprising:
  scanning the document in paper format to obtain an image document;
  performing layout analysis on the image document.

10. A watermark embedding apparatus for embedding a secret message sequence in a document, said apparatus comprising:
  a layout information obtaining unit for obtaining layout information of said document;
  a digest extracting unit for extracting a digest of said document by using a Hash function;
  an embedded position calculating unit for calculating embedded positions where said secret message sequence is embedded in said document, wherein said embedded position calculating unit calculates the embedded positions by means of a public key driven finite state machine;
  an information hiding unit for dispersedly hiding said secret message sequence in each of said calculated embedded positions by altering the layout of said document.

11. The watermark embedding apparatus according to claim 10, wherein said embedded position calculating unit further comprises:
  a unit for calculating an initial state based on the extracted digest and said secret message sequence;
  a unit for calculating a state sequence based on the initial state and a public key;
  a unit for calculating the embedded position sequence based on the state sequence.

12. The watermark embedding apparatus according to claim 10, wherein said document is a text document.

13. The watermark embedding apparatus according to claim 10, wherein said layout information obtaining unit further comprises a unit for dividing said document into a plurality of segments.

14. The watermark embedding apparatus according to claim 13, wherein said information hiding unit dispersedly hides each secret message of said secret message sequence by altering inter-word spaces in the corresponding segment indicated by each of the calculated embedded positions.

15. The watermark embedding apparatus according to claim 13, wherein said information hiding unit dispersedly hides each secret message of said secret message sequence by altering font styles in the corresponding segment indicated by each of the calculated embedded positions.

16. The watermark embedding apparatus according to claim 10, wherein said document is an electronic document.

17. The watermark embedding apparatus according to claim 16, wherein said document is a document in printer description language format, and wherein said watermark embedding apparatus further comprises:
  a printer language analysis unit for performing printer language analysis on the document in printer description language format, and separating a printer command and content of the electronic document itself for further processing;
  a printer language reassembling unit for reassembling the printer command and the content of the document embedded with the secret message sequence to generate a reassembled printer language document for printing.

18. The watermark embedding apparatus according to claim 17, wherein the watermark embedding apparatus can be disposed between a document editor and a printer.

19. The watermark embedding apparatus according to claim 10, wherein said document is an image document, and said watermark embedding apparatus further comprises a unit for performing layout analysis on the image document to obtain the layout information.

20. A watermark detecting method for detecting from a document a secret message sequence embedded therein, said method comprising:
  obtaining layout information of said document;
  extracting a digest of said document by using a Hash function;
  calculating by a computer processor embedded positions where said secret message sequence is embedded in said document, wherein said calculating the embedded positions is performed by means of a public key driven finite state machine;
  extracting each secret message of said secret message sequence based on layout changes in each of the calculated embedded positions, respectively.

21. The watermark detecting method according to claim 20, further comprising repeating said calculating the embedded positions and said extracting the secret message sequence until it is determined that all the embedded secret messages have been extracted based on current state, said digest of the document and each of said extracted secret messages.

22. The watermark detecting method according to claim 21, wherein said calculating the embedded positions further comprises:
  calculating a previous state based on the current state and a private key; and
  calculating the embedded positions based on the calculated states.

23. The watermark detecting method according to claim 20, wherein said obtaining the layout information further comprises dividing said document into a plurality of segments.

24. The watermark detecting method according to claim 23, wherein said extracting the secret message sequence further comprising extracting each secret message of said secret message sequence based on inter-word space changes in the corresponding segment indicated by each of the calculated embedded positions, respectively.

25. The watermark detecting method according to claim 23, wherein said extracting the secret message sequence further comprises extracting each secret message of said secret message sequence based on font style changes in the corresponding segment indicated by each of the calculated embedded positions, respectively.

26. The watermark detecting method according to claim 20, wherein said document is a text document.

27. The watermark detecting method according to claim 20, wherein said document is an electronic document.

28. The watermark detecting method according to claim 20, wherein said document is an image document, and wherein said method further comprises a step of performing layout analysis on the image document before said step of obtaining the layout information.

29. The watermark detecting method according to claim 20, wherein said document is in paper format, and before said obtaining the layout information, said method further comprises:

scanning the document in paper format to obtain an image document; and performing layout analysis on the image document.

30. A watermark detecting apparatus for detecting from a document a secret message sequence embedded therein, that said apparatus comprising:

a layout information obtaining unit for obtaining layout information of said document;

a digest extracting unit for extracting a digest of said document by using a Hash function;

an embedded position calculating unit for calculating embedded positions where said secret message sequence is embedded in said document, wherein said embedded position calculating unit calculates the embedded positions by means of a public key driven finite state machine; and an information extracting unit for extracting each secret message of said secret message sequence based on layout changes in each of the calculated embedded positions, respectively.

31. The watermark detecting apparatus according to claim 30, further comprises:

a deciding unit for deciding whether all the embedded secret messages have been extracted based on current state, said digest of the document and each of said extracted secret messages.

32. The watermark detecting apparatus according to claim 31, wherein said embedded position calculating unit further comprises:

a unit for calculating a previous state based on the current state and a private key;

a unit for calculating the embedded positions based on the calculated states; and wherein said unit for calculating the state and said unit for calculating the embedded positions perform iterative calculation when the decision result of said deciding unit indicates that there still are the embedded secret messages to be extracted.

33. The watermark detecting apparatus according to claim 30, wherein said layout information obtaining unit further comprises a unit for dividing said document into a plurality of segments.

34. The watermark detecting apparatus according to claim 33, wherein said information extracting unit extracts each secret message of said secret message sequence based on inter-word space changes in the corresponding segment indicated by each of the calculated embedded positions, respectively.

35. The watermark detecting apparatus according to claim 33, wherein said information extracting unit extracts each secret message of said secret message sequence based on font style changes in the corresponding segment indicated by each of the calculated embedded positions, respectively.

36. The watermark detecting apparatus according to claim 30, wherein said document is a text document.

37. The watermark detecting apparatus according to claim 30, wherein said document is an electronic document.

38. The watermark detecting apparatus according to claim 30, wherein said document is an image document, and wherein said watermark detecting apparatus further comprises a unit for performing layout analysis on the image document to obtain the layout information.

* * * * *